(12) United States Patent
Rosen et al.

(10) Patent No.: US 10,066,990 B2
(45) Date of Patent: Sep. 4, 2018

(54) SPATIALLY VARIABLE FILTER SYSTEMS AND METHODS

(71) Applicant: VERIFOOD, Ltd., Herzliya (IL)

(72) Inventors: Sagee Rosen, Netzer Sireni (IL); Uri Kinrot, Hod HaSharon (IL)

(73) Assignee: VERIFOOD, LTD., Herzliya (IL)

( * ) Notice: Subject to any disclaimer, the term of this patent is extended or adjusted under 35 U.S.C. 154(b) by 0 days.

(21) Appl. No.: 15/191,031

(22) Filed: Jun. 23, 2016

(65) Prior Publication Data

US 2017/0010160 A1   Jan. 12, 2017

Related U.S. Application Data

(60) Provisional application No. 62/190,544, filed on Jul. 9, 2015.

(51) Int. Cl.
*G01J 3/51* (2006.01)
*G01J 3/02* (2006.01)
(Continued)

(52) U.S. Cl.
CPC ............... *G01J 3/0256* (2013.01); *G01J 3/26* (2013.01); *G01J 3/2803* (2013.01); *G01J 3/36* (2013.01); *G01J 2003/2806* (2013.01)

(58) Field of Classification Search
CPC .... G01J 3/0256; G01J 3/36; G01J 3/26; G01J 3/2803; G01J 2003/2806
See application file for complete search history.

(56) References Cited

U.S. PATENT DOCUMENTS

| 679,577 A | 7/1901 | Schaffner |
|---|---|---|
| 3,971,065 A | 7/1976 | Bayer |

(Continued)

FOREIGN PATENT DOCUMENTS

| CN | 1846114 A | 10/2006 |
|---|---|---|
| CN | 101501465 A | 8/2009 |

(Continued)

OTHER PUBLICATIONS

Acktar Advanced Coatings Website. Accessed Jun. 3, 2015. http://www.acktar.com/.

(Continued)

*Primary Examiner* — Dominic J Bologna
(74) *Attorney, Agent, or Firm* — Wilson, Sonsini, Goodrich & Rosati

(57) ABSTRACT

An improved compact spectrometer system comprising an improved spatially variable filter is disclosed herein. A spatially variable filter may be configured to have a plurality of different transmission profiles at different locations of the filter, to spectrally separate light incident on the filter. The spatially variable filter may comprise a plurality of different filter regions having different transmission profiles, and a plurality of similar filter regions comprising similar transmission profiles. The spatially variable filter may be optically coupled to a detector comprising a plurality of detector elements configured to measure the intensity of light. The measurement data generated by the plurality of detector elements coupled to the plurality of similar filter regions can be used to determine a spatial variation on incident light intensity.

19 Claims, 10 Drawing Sheets

(51) Int. Cl.
*G01J 3/26* (2006.01)
*G01J 3/28* (2006.01)
*G01J 3/36* (2006.01)

(56) References Cited

U.S. PATENT DOCUMENTS

| | | | |
|---|---|---|---|
| 4,884,860 A | 12/1989 | Brown | |
| 5,059,795 A | 10/1991 | Izumi | |
| 5,159,199 A * | 10/1992 | LaBaw | G01J 3/02 |
| | | | 250/339.02 |
| 5,469,252 A | 11/1995 | Doles et al. | |
| 5,966,212 A | 10/1999 | Hendler et al. | |
| 6,031,233 A | 2/2000 | Levin et al. | |
| 6,031,619 A | 2/2000 | Wilkens et al. | |
| 6,069,696 A | 5/2000 | McQueen et al. | |
| 6,072,576 A | 6/2000 | McDonald et al. | |
| 6,212,312 B1 | 4/2001 | Grann et al. | |
| 6,323,944 B1 * | 11/2001 | Xiao | G01J 3/02 |
| | | | 250/458.1 |
| 6,333,501 B1 | 12/2001 | Labrenz | |
| 6,441,375 B1 | 8/2002 | Joseph et al. | |
| 6,456,373 B1 | 9/2002 | Wienecke et al. | |
| 6,483,583 B1 | 11/2002 | Wright et al. | |
| 6,615,142 B1 | 9/2003 | Hovde | |
| 6,639,666 B2 | 10/2003 | Li | |
| 6,700,661 B1 | 3/2004 | Cadell et al. | |
| 6,717,669 B2 | 4/2004 | Ruiz | |
| 6,836,325 B2 | 12/2004 | Maczura et al. | |
| 6,864,978 B1 | 3/2005 | Hazen et al. | |
| 6,958,479 B2 | 10/2005 | Burling-Claridge et al. | |
| 7,009,702 B2 | 3/2006 | Caruso et al. | |
| 7,038,774 B2 | 5/2006 | Hazen et al. | |
| 7,068,366 B2 | 6/2006 | Burk et al. | |
| 7,075,643 B2 | 7/2006 | Holub | |
| 7,084,974 B1 | 8/2006 | Barwicz et al. | |
| 7,145,650 B2 | 12/2006 | Wang et al. | |
| 7,151,600 B2 | 12/2006 | Imura | |
| 7,158,225 B2 | 1/2007 | Tedesco et al. | |
| 7,235,766 B2 | 6/2007 | Shur et al. | |
| 7,236,243 B2 | 6/2007 | Beecroft et al. | |
| 7,245,372 B2 | 7/2007 | Han | |
| 7,248,370 B2 | 7/2007 | Jones | |
| 7,251,037 B2 | 7/2007 | Jones | |
| 7,262,839 B2 | 8/2007 | Treado et al. | |
| 7,286,233 B2 | 10/2007 | Pizzi | |
| 7,339,665 B2 | 3/2008 | Imura | |
| 7,414,724 B2 | 8/2008 | Eckert et al. | |
| 7,420,663 B2 | 9/2008 | Wang et al. | |
| 7,426,446 B2 | 9/2008 | Hagler | |
| 7,433,042 B1 | 10/2008 | Cavanaugh et al. | |
| 7,436,511 B2 | 10/2008 | Ruchti et al. | |
| 7,489,396 B1 | 2/2009 | Vrhel et al. | |
| 7,528,957 B2 | 5/2009 | Lewis et al. | |
| 7,535,617 B2 | 5/2009 | Gupta et al. | |
| 7,649,627 B2 | 1/2010 | Yamamoto | |
| 7,667,740 B2 | 2/2010 | Hofer | |
| 7,697,136 B2 | 4/2010 | Imura | |
| 7,767,969 B2 | 8/2010 | Nagai et al. | |
| 7,805,319 B2 | 9/2010 | Badinelli | |
| 7,817,273 B2 | 10/2010 | Bahatt et al. | |
| 7,868,296 B2 | 1/2011 | Haran et al. | |
| 7,876,435 B2 | 1/2011 | Becker-Ross et al. | |
| 7,881,892 B2 | 2/2011 | Soyemi et al. | |
| 7,897,923 B2 | 3/2011 | Shelley et al. | |
| 7,907,282 B2 | 3/2011 | Coates | |
| 7,929,130 B2 | 4/2011 | Dirk | |
| 7,986,193 B2 | 7/2011 | Krah | |
| 7,999,933 B2 | 8/2011 | McClure | |
| 8,060,383 B2 | 11/2011 | Badinelli | |
| 8,125,633 B2 | 2/2012 | Whelan et al. | |
| 8,144,322 B2 | 3/2012 | Nagashima et al. | |
| 8,149,415 B2 | 4/2012 | Sanders et al. | |
| 8,169,607 B2 | 5/2012 | Sano et al. | |
| 8,169,608 B2 | 5/2012 | Sano et al. | |
| 8,247,774 B2 | 8/2012 | Chou et al. | |
| 8,269,174 B2 | 9/2012 | Gardner, Jr. et al. | |
| 8,274,739 B2 | 9/2012 | Lee et al. | |
| 8,284,401 B2 | 10/2012 | Choi et al. | |
| 8,330,945 B2 | 12/2012 | Choi et al. | |
| 8,462,420 B2 | 6/2013 | Lee et al. | |
| 8,477,305 B2 | 7/2013 | Shibayama et al. | |
| 8,526,002 B2 | 9/2013 | Deflores et al. | |
| 8,542,359 B2 | 9/2013 | Choi, II et al. | |
| 8,593,628 B2 | 11/2013 | Shimbo et al. | |
| 8,604,412 B2 | 12/2013 | Shibayama et al. | |
| 8,654,327 B2 | 2/2014 | Bohle et al. | |
| 8,665,440 B1 | 3/2014 | Kompaniets et al. | |
| 8,675,188 B2 | 3/2014 | Liu et al. | |
| 8,711,360 B2 | 4/2014 | Funamoto | |
| 8,711,362 B2 | 4/2014 | Funamoto | |
| 8,735,820 B2 | 5/2014 | Mertens | |
| 8,742,320 B2 | 6/2014 | Shibayama et al. | |
| 8,760,645 B2 | 6/2014 | Misener et al. | |
| 8,773,659 B2 | 7/2014 | McClure | |
| 8,786,854 B2 | 7/2014 | Miyazono | |
| 8,848,187 B2 | 9/2014 | Uematsu et al. | |
| 8,862,445 B2 | 10/2014 | Priore et al. | |
| 8,867,033 B2 | 10/2014 | Carron et al. | |
| 8,868,387 B2 | 10/2014 | Den et al. | |
| 8,873,046 B2 | 10/2014 | Miyazono | |
| 8,937,717 B2 | 1/2015 | Preston et al. | |
| 8,976,357 B2 | 3/2015 | Uematsu et al. | |
| 9,030,662 B2 | 5/2015 | Lee et al. | |
| 9,060,113 B2 | 6/2015 | Rhoads et al. | |
| 9,063,011 B2 | 6/2015 | Chen et al. | |
| 9,074,933 B2 | 7/2015 | Yokino et al. | |
| 9,128,055 B2 | 9/2015 | Sekino et al. | |
| 9,163,986 B2 | 10/2015 | Bouckaert | |
| 9,173,508 B2 | 11/2015 | Tornwall et al. | |
| 9,182,280 B1 | 11/2015 | Gardner et al. | |
| 9,234,800 B2 | 1/2016 | Kawamata et al. | |
| 9,239,264 B1 | 1/2016 | Demers | |
| D750,988 S | 3/2016 | Goldring | |
| D751,435 S | 3/2016 | Goldring | |
| 9,291,504 B2 | 3/2016 | Goldring et al. | |
| 9,297,821 B2 | 3/2016 | Walter et al. | |
| 9,301,626 B2 | 4/2016 | Tornwall et al. | |
| 9,310,564 B2 | 4/2016 | Martinelli et al. | |
| 9,377,396 B2 | 6/2016 | Goldring et al. | |
| 9,383,258 B2 | 7/2016 | Goldring et al. | |
| 9,383,308 B2 | 7/2016 | Bradley et al. | |
| 9,395,244 B2 | 7/2016 | Kurokawa et al. | |
| 9,417,180 B2 | 8/2016 | Seo et al. | |
| 9,448,114 B2 | 9/2016 | Goldring et al. | |
| 9,448,165 B2 | 9/2016 | Gulati et al. | |
| 9,453,794 B2 | 9/2016 | Gulati et al. | |
| 9,464,934 B2 | 10/2016 | Priore et al. | |
| 9,488,468 B2 | 11/2016 | Tsujii et al. | |
| 9,488,523 B2 | 11/2016 | Yokino et al. | |
| 9,500,523 B2 | 11/2016 | Goldring et al. | |
| 9,508,765 B2 | 11/2016 | Owa et al. | |
| 9,518,917 B2 | 12/2016 | Scherer et al. | |
| 9,546,902 B2 | 1/2017 | Kovacich et al. | |
| 9,546,904 B2 | 1/2017 | Pawluczyk et al. | |
| 9,557,220 B2 | 1/2017 | Yasui et al. | |
| 9,562,848 B2 | 2/2017 | Goldring et al. | |
| 9,568,363 B2 | 2/2017 | Yu et al. | |
| 9,574,942 B2 | 2/2017 | Goldring et al. | |
| 9,587,982 B2 | 3/2017 | Goldring et al. | |
| 2001/0009972 A1 | 7/2001 | Doi et al. | |
| 2002/0039186 A1 | 4/2002 | Rosenberg et al. | |
| 2002/0131047 A1 | 9/2002 | Zarrabian et al. | |
| 2002/0145728 A1 | 10/2002 | Adams et al. | |
| 2002/0154315 A1 * | 10/2002 | Myrick | G01J 3/18 |
| | | | 356/305 |
| 2002/0163641 A1 | 11/2002 | Shroder | |
| 2002/0191127 A1 | 12/2002 | Roberts et al. | |
| 2002/0193671 A1 | 12/2002 | Ciurczak et al. | |
| 2003/0122080 A1 | 7/2003 | Burling-Claridge et al. | |
| 2004/0019462 A1 | 1/2004 | Gehrlein et al. | |
| 2004/0136577 A1 | 7/2004 | Rao et al. | |
| 2004/0213459 A1 | 10/2004 | Ishimaru et al. | |
| 2005/0117151 A1 | 6/2005 | Han | |
| 2005/0128477 A1 | 6/2005 | Caruso et al. | |

(56) References Cited

U.S. PATENT DOCUMENTS

| | | |
|---|---|---|
| 2005/0149598 A1 | 7/2005 | Mendlovic et al. |
| 2005/0151975 A1 | 7/2005 | Melnyk |
| 2005/0196046 A1 | 9/2005 | Hudnut et al. |
| 2006/0086901 A1 | 4/2006 | Price et al. |
| 2006/0124656 A1 | 6/2006 | Popovich, Jr. et al. |
| 2006/0132760 A1 | 6/2006 | Imura |
| 2006/0146315 A1 | 7/2006 | Treado |
| 2006/0279732 A1 | 12/2006 | Wang et al. |
| 2006/0280096 A1 | 12/2006 | Riley et al. |
| 2007/0145273 A1 | 6/2007 | Chang |
| 2007/0230932 A1 | 10/2007 | Tanaka et al. |
| 2007/0290284 A1* | 12/2007 | Shaffer ............... H01L 27/1446 257/432 |
| 2008/0061236 A1 | 3/2008 | Meredith et al. |
| 2008/0073510 A1 | 3/2008 | Finlay |
| 2008/0112853 A1 | 5/2008 | Hall |
| 2008/0137328 A1 | 6/2008 | Lee et al. |
| 2008/0151241 A1 | 6/2008 | Lindfors et al. |
| 2008/0204578 A1 | 8/2008 | Scheuch et al. |
| 2008/0265146 A1 | 10/2008 | Coates |
| 2008/0277625 A1 | 11/2008 | Nakamura et al. |
| 2008/0297379 A1 | 12/2008 | Yang et al. |
| 2008/0297791 A1 | 12/2008 | Imura |
| 2009/0051910 A1 | 2/2009 | Imura |
| 2009/0201577 A1 | 8/2009 | Laplante et al. |
| 2009/0213361 A1 | 8/2009 | Vander et al. |
| 2009/0294637 A1 | 12/2009 | Kusano et al. |
| 2010/0078564 A1 | 4/2010 | McAllister et al. |
| 2010/0080351 A1 | 4/2010 | Hession-Kunz et al. |
| 2010/0085537 A1 | 4/2010 | Ramella-Roman et al. |
| 2010/0110442 A1 | 5/2010 | Adibi et al. |
| 2010/0128370 A1 | 5/2010 | Chen et al. |
| 2010/0134794 A1 | 6/2010 | Odegard et al. |
| 2010/0165337 A1 | 7/2010 | Dirk |
| 2010/0191493 A1 | 7/2010 | Brown et al. |
| 2010/0201979 A1 | 8/2010 | Momtahan et al. |
| 2010/0271352 A1 | 10/2010 | Nakano et al. |
| 2010/0284005 A1 | 11/2010 | Malinen et al. |
| 2010/0292581 A1 | 11/2010 | Howard et al. |
| 2010/0309454 A1 | 12/2010 | Zhang |
| 2011/0037975 A1 | 2/2011 | McClure |
| 2011/0082449 A1 | 4/2011 | Melsky et al. |
| 2011/0215432 A1* | 9/2011 | Uematsu ............. A61B 5/14552 257/432 |
| 2011/0255745 A1 | 10/2011 | Hodder et al. |
| 2011/0261252 A1 | 10/2011 | Chen |
| 2011/0299104 A1* | 12/2011 | Seo ..................... G01J 3/02 358/1.9 |
| 2011/0318717 A1 | 12/2011 | Adamowicz |
| 2012/0001083 A1 | 1/2012 | Knapp |
| 2012/0018829 A1 | 1/2012 | Beck et al. |
| 2012/0019819 A1 | 1/2012 | Messerchmidt |
| 2012/0053426 A1 | 3/2012 | Webster et al. |
| 2012/0088486 A1 | 4/2012 | Messerchmidt |
| 2012/0099102 A1 | 4/2012 | Bello |
| 2012/0286046 A1 | 11/2012 | Ciurczak et al. |
| 2012/0327248 A1* | 12/2012 | Tack .................... G01J 3/26 348/164 |
| 2013/0021611 A1 | 1/2013 | Tsurutani |
| 2013/0107260 A1 | 5/2013 | Nozawa |
| 2013/0155402 A1 | 6/2013 | Walton et al. |
| 2013/0182250 A1 | 7/2013 | McClure |
| 2013/0258341 A1 | 10/2013 | Day et al. |
| 2014/0002817 A1 | 1/2014 | Ross et al. |
| 2014/0029004 A1* | 1/2014 | Bodkin .................. G01J 3/02 356/328 |
| 2014/0046630 A1 | 2/2014 | Smith et al. |
| 2014/0052555 A1 | 2/2014 | MacIntosh |
| 2014/0061486 A1 | 3/2014 | Bao et al. |
| 2014/0064479 A1 | 3/2014 | Manikandan et al. |
| 2014/0168636 A1 | 6/2014 | Funamoto et al. |
| 2014/0192255 A1* | 7/2014 | Shroff ................... G01N 21/27 348/362 |
| 2014/0293091 A1 | 10/2014 | Rhoads et al. |
| 2014/0320858 A1 | 10/2014 | Goldring et al. |
| 2014/0333932 A1 | 11/2014 | Uematsu et al. |
| 2015/0036138 A1 | 2/2015 | Watson et al. |
| 2015/0055132 A1 | 2/2015 | Ricketts et al. |
| 2015/0062577 A1 | 3/2015 | Hartwell et al. |
| 2015/0103354 A1 | 4/2015 | Saptari et al. |
| 2015/0108333 A1 | 4/2015 | Bouckaert |
| 2015/0116707 A1 | 4/2015 | Tatsuda |
| 2015/0119661 A1 | 4/2015 | Gilbert et al. |
| 2015/0153225 A1 | 6/2015 | Baudelet |
| 2015/0204833 A1 | 7/2015 | O'Brien et al. |
| 2015/0260573 A1* | 9/2015 | Ishimaru ............... G01J 3/4532 356/451 |
| 2015/0292948 A1 | 10/2015 | Goldring et al. |
| 2015/0300879 A1 | 10/2015 | Goldring et al. |
| 2015/0323383 A1 | 11/2015 | Pastore et al. |
| 2015/0369725 A1 | 12/2015 | Carvalho et al. |
| 2016/0018260 A1 | 1/2016 | Samuels |
| 2016/0033328 A1 | 2/2016 | Walters |
| 2016/0091369 A1 | 3/2016 | Sakurai et al. |
| 2016/0103069 A1 | 4/2016 | Umapathy et al. |
| 2016/0223400 A1 | 8/2016 | Carron et al. |
| 2016/0231171 A1 | 8/2016 | Assefa et al. |
| 2016/0245700 A1 | 8/2016 | Uematsu et al. |
| 2016/0258813 A1 | 9/2016 | Kuri |
| 2016/0263910 A1 | 9/2016 | Kanai et al. |
| 2016/0282182 A1 | 9/2016 | Kanai et al. |
| 2016/0290863 A1 | 10/2016 | Goldring et al. |
| 2016/0299004 A1 | 10/2016 | Thamm |
| 2016/0299061 A1 | 10/2016 | Goldring et al. |
| 2016/0305820 A1 | 10/2016 | Zollars et al. |
| 2016/0313184 A1 | 10/2016 | Owechko |
| 2016/0334274 A1 | 11/2016 | Xu |
| 2016/0356646 A1 | 12/2016 | Wiegand et al. |
| 2016/0356647 A1 | 12/2016 | Wiegand et al. |
| 2016/0356704 A1 | 12/2016 | Kim et al. |
| 2017/0003167 A1 | 1/2017 | Ave |
| 2017/0027447 A1 | 2/2017 | Sutin et al. |
| 2017/0038257 A1 | 2/2017 | Liu et al. |
| 2017/0153142 A1 | 6/2017 | Rosen et al. |
| 2017/0160131 A1 | 6/2017 | Goldring et al. |
| 2017/0234729 A1 | 8/2017 | Goldring et al. |
| 2017/0254701 A1 | 9/2017 | Goldring et al. |
| 2018/0003558 A1 | 1/2018 | Goldring et al. |

FOREIGN PATENT DOCUMENTS

| | | |
|---|---|---|
| JP | H0792022 A | 4/1995 |
| JP | 2001236583 A | 8/2001 |
| JP | 2002277326 A | 9/2002 |
| JP | 2004294361 A | 10/2004 |
| JP | 2005148018 A | 6/2005 |
| JP | 2007218878 A | 8/2007 |
| JP | 2008286522 A | 11/2008 |
| JP | 2009104547 A | 5/2009 |
| JP | 2011198801 A | 10/2011 |
| WO | WO-9953350 A1 | 10/1999 |
| WO | WO-2010027982 A2 | 3/2010 |
| WO | WO-2010036906 A1 | 4/2010 |
| WO | WO-2013065035 A1 | 5/2013 |
| WO | WO-2013082272 A1 | 6/2013 |
| WO | WO-2013106307 A1 | 7/2013 |
| WO | WO-2013148461 A1 | 10/2013 |
| WO | WO-2013150290 A1 | 10/2013 |
| WO | WO-2013162850 A1 | 10/2013 |
| WO | WO-2013163268 A1 | 10/2013 |
| WO | WO-2013165887 A1 | 11/2013 |
| WO | WO-2014014534 A2 | 1/2014 |
| WO | WO-2014033783 A1 | 3/2014 |
| WO | WO-2014014534 A3 | 4/2014 |
| WO | WO-2014064447 A1 | 5/2014 |
| WO | WO-2014102629 A1 | 7/2014 |
| WO | WO-2014129305 A1 | 8/2014 |
| WO | WO-2014139003 A1 | 9/2014 |
| WO | WO-2014192007 A1 | 12/2014 |
| WO | WO-2015009602 A1 | 1/2015 |
| WO | WO-2015015493 A2 | 2/2015 |
| WO | WO-2015015493 A3 | 3/2015 |
| WO | WO-2015038372 A1 | 3/2015 |

(56) References Cited

FOREIGN PATENT DOCUMENTS

| WO | WO-2015042617 A1 | 3/2015 |
|----|------------------|--------|
| WO | WO-2015058166 A2 | 4/2015 |
| WO | WO-2015058166 A3 | 6/2015 |
| WO | WO-2015101992 A2 | 7/2015 |
| WO | WO-2015101992 A3 | 9/2015 |
| WO | WO-2015138028 A2 | 9/2015 |
| WO | WO-2015138028 A3 | 11/2015 |
| WO | WO-2016022283 A1 | 2/2016 |
| WO | WO-2016033224 A1 | 3/2016 |
| WO | WO-2016059946 A1 | 4/2016 |
| WO | WO-2016063284 A2 | 4/2016 |
| WO | WO-2016124659 A1 | 8/2016 |
| WO | WO-2016125165 A2 | 8/2016 |
| WO | WO-2016125165 A3 | 12/2016 |
| WO | WO-2016196727 A2 | 12/2016 |
| WO | WO-2016196727 A3 | 1/2017 |

OTHER PUBLICATIONS

Anoplate Website. Accessed Jun. 3, 2015. http://www.anoplate.com/capabilities/anoblack_ni.html.
Avian Technologies Website. Accessed Jun. 3, 2015. http://www.aviantechnologies.com/products/coatings/diffuse_black.php.
Co-pending U.S. Appl. No. 15/479,105, filed Apr. 4, 2017.
Co-pending U.S. Appl. No. 15/482,546, filed Apr. 7, 2017.
Co-pending U.S. Appl. No. 15/493,006, filed Apr. 20, 2017.
Co-pending U.S. Appl. No. 15/660,573, filed Jul. 26, 2017.
Co-pending U.S. Appl. No. 15/667,360, filed Aug. 2, 2017.
Co-pending U.S. Appl. No. 15/667,489, filed Aug. 2, 2017.
Co-pending U.S. Appl. No. 15/713,198, filed Sep. 22, 2017.
Co-pending U.S. Appl. No. 15/727,291, filed Nov. 16, 2017.
Co-pending U.S. Appl. No. 15/796,290, filed Oct. 27, 2017.
European search report and search opinion dated Feb. 7, 2017 for EP Application No. 14831451.1.
European search report and search opinion dated Jul. 24, 2015 for EP Application No. 12845773.6.
European search report and search opinion dated Aug. 7, 2017 for EP Application No. 15733267.7.
Interference Filter Handbook, published by JDS Uniphase (Second Edition), Sep. 2006, p. 195-202 and 213-214.
International search report and written opinion dated Jan. 26, 2015 for PCT Application No. IL2014/050688.
International search report and written opinion dated Mar. 22, 2013 for PCT Application No. IL2012/000367.
International search report and written opinion dated Jul. 14, 2015 for PCT Application No. PCT/IL2015/050002.
International search report and written opinion dated Aug. 25, 2016 for PCT Application No. PCT/IL2016/050130.

\* cited by examiner

FIG. 7A

| 701a | | | | | | | 700a |
|---|---|---|---|---|---|---|---|
| 701 | 702 | 703 | 704 | 705 | 706 | 707 | 708 |
| 708 | 707 | 706 | 705 | 704 | 703 | 702 | 701 |

| 701 | 702 | 703 | 704 | 705 | 706 | 707 | 708 |
|---|---|---|---|---|---|---|---|
| 709 | 709 | 709 | 709 | 709 | 709 | 709 | 709 |

| | 701 | 702 | 703 | 704 | 705 | 706 | 707 | 708 |
|---|---|---|---|---|---|---|---|---|
| 701a | 701 | 702 | 703 | 704 | 705 | 706 | 707 | 708 |
| 701b | 701 | 702 | 703 | 704 | 705 | 706 | 707 | 708 |
| 701c | 701 | 702 | 703 | 704 | 705 | 706 | 707 | 708 |
| 701d | 701 | 702 | 703 | 704 | 705 | 706 | 707 | 708 |
| 701e | 701 | 702 | 703 | 704 | 705 | 706 | 707 | 708 |
| | 709 | 709 | 709 | 709 | 709 | 709 | 709 | 709 |

709a 709b 709c 709d 709e 709f 709g 709h

715c

US 10,066,990 B2

SPATIALLY VARIABLE FILTER SYSTEMS AND METHODS

CROSS-REFERENCE

The present application claims the benefit of U.S. Provisional Patent Application No. 62/190,544, filed on Jul. 9, 2015, the entire contents of which are incorporated herein by reference.

The subject matter of the present application is also related to U.S. patent application Ser. No. 14/356,144, now U.S. Pat. No. 9,377,396, filed May 2, 2014, entitled "Low-Cost Spectrometry System for End-User Food Analysis", U.S. patent application Ser. No. 14/702,342, now U.S. Pat. No. 9,291,504, filed on May 1, 2015, entitled "Spectrometry System with Decreased Light Path", PCT Application PCT/IL2015/050002, filed on Jan. 1, 2015, entitled "Spectroscopic Devices and Systems", PCT Application PCT/IL2015/051040, filed on Oct. 22, 2015, entitled "Accessories for Handheld Spectrometer", PCT Application PCT/IL2016/050130, filed on Feb. 4, 2016, entitled "Spectrometry System with Visible Aiming Beam", and PCT Application PCT/IL2016/050362, entitled "Detector for Spectrometry System", each of which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Spectrometers are used for many purposes. For example, spectrometers are used in the detection of defects in industrial processes, satellite imaging, and laboratory research. However, these instruments have typically been too large and too costly for the consumer market.

Spectrometers detect radiation from a sample and process the resulting signal to obtain and present information about the sample that includes spectral, physical and chemical information about the sample. These instruments generally include some type of spectrally selective element to separate wavelengths of radiation received from the sample, and a first-stage optic, such as a lens, to focus or concentrate the radiation onto an imaging array.

Prior spectrometers and filters, such as linear variable filters, can be used as wavelength separating elements for compact spectrometers. A linear variable filter can be generally configured to have a plurality of transmission profiles, that vary across a length of the filter. Collimated light incident on the linearly variable filter may be spectrally separated by the filter, based on the location at which the incident light hits the filter. A detector optically coupled to the filter can detect the intensity of incident light at different wavelengths. The prior spectrometers and spatially variable filters can be subjected to incident light having a non-uniform intensity distribution across the area of the filter. Such spatial variation of the incident light intensity can produce distortions in the spectral representation of the measured sample.

The prior spatially variable filters for separation of incident light can be less than ideally suited for use with compact spectrometers. For example, prior linear variable filters can introduce distortions into the output spectrum of the incident light. Such distortions may be attributable to, for example, changes in the position and/or orientation of the spectrometer's input window with respect to the sample plane. Therefore, prior spatially variable filters may be less than ideally suited for use with compact spectrometers, which ideally can measure samples at various positions and orientations with respect to the spectrometer's input window.

In light of the above, improved spatially variable filters and compact spectrometers would be beneficial. Ideally, such improved spatially variable filters and compact spectrometers would reduce distortions of the output spectrum due to variations in incident light intensity across the area of the filter.

SUMMARY OF THE INVENTION

An improved compact spectrometer system comprising an improved spatially variable filter is disclosed herein. The spectrometer comprises a spatially variable filter in order to adjust output spectral data in response to spatial variations of light energy incident on the filter. The spatially variable filter may comprise a plurality of spaced apart filter regions having similar transmission profiles in order to measure spatial variation of the input light energy incident on the spatially variable filter. The measured spatial variation of the input light energy can be used to adjust output spectral data in order to reduce distortion of the output spectral data related to the spatial variation in intensity of the light energy incident on the spatially variable filter.

The spatially variable filter may be configured with a plurality of different transmission profiles at different locations of the filter, to spectrally separate light incident on the filter. The spatially variable filter may comprise one or more linear variable filters, discrete filters, or combinations thereof. The spatially variable filter may comprise a plurality of different filters having different transmission profiles. Each of the different filters may comprise a plurality of similar filters at a plurality of locations of the spatially variable filter, the similar filters having similar transmission profiles.

The spatially variable filter may be optically coupled to a detector comprising a plurality of detector elements such as pixels, each pixel configured to measure an intensity of incident light that has been spectrally separated by the spatially variable filter. The spatially variable filter and the detector can be configured to generate measurement data indicative of the spatial distribution of the incident light. The spatial distribution of the incident light can then be used to adjust the measurement data of the spectrally separated incident light. A processor may be operatively coupled to the detector, wherein the processor comprises instructions to adjust the measurement data based on intensity variations in the incident light. The spatially variable filter system can generate adjusted spectra with reduced distortions resulting from non-uniform light distribution on the filter.

In one aspect, a spectrometer comprises a spatially variable filter, a detector, and a processor, wherein the spatially variable filter comprises a first plurality of similar spaced apart regions having similar transmission profiles and a second plurality of different spaced apart regions having different transmission profiles. The detector comprises a plurality of detector elements coupled to the spatially variable filter. The processor is configured with instructions to receive data from the detector and output spectral data to determine a spectrum in response to transmitted light intensity at the plurality of similar spaced apart regions and the plurality of different spaced apart regions.

In another aspect, a spatially variable filter comprises a plurality of different filter regions comprising different transmission profiles at a plurality of locations of the spatially variable filter to spectrally separate light incident on the filter. At least one of the different transmission profiles is repeated at a plurality of spaced apart regions of the spatially variable filter.

In another aspect, a spectrometer system comprises a spatially variable filter having a plurality of different transmission profiles, wherein at least one of the plurality of different transmission profiles is repeated at two or more spaced apart regions of the spatially variable filter. The spectrometer system further comprises a detector optically coupled to the spatially variable filter, and a processor coupled to the detector. The processor is configured to measure transmitted light intensity at the plurality of non-adjacent locations of the spatially variable filter in order to adjust output spectra in response to intensity variations among the plurality of similar filters at the plurality of non-adjacent locations.

In another aspect, a method of measuring spectra comprises measuring an intensity of light incident on each of a plurality of detector elements of a detector, wherein the plurality of detector elements are coupled to a plurality of different spaced apart regions and a plurality of similar spaced apart regions of a spatially variable filter. The method further comprises determining a spatial variation in incident light intensity across the area of the spatially variable filter, based on measurement data generated by the detector. The method further comprises adjusting the measurement data generated by the detector to reduce the spatial variation in incident light intensity. The method further comprises generating an adjusted spectra of the incident light based on the adjusted measurement data.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 7A-7C illustrate exemplary configurations of a spatially variable filter suitable for incorporation with a compact spectrometer;

DETAILED DESCRIPTION OF THE INVENTION

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

A better understanding of the features and advantages of the present disclosure will be obtained by reference to the following detailed description that sets forth illustrative embodiments, in which the principles of embodiments of the present disclosure are utilized, and the accompanying drawings.

As used herein the term arcuate encompasses one or more of curved, elliptical, annular or conical shapes, and portions of these shapes and linear approximations thereof.

As used herein, like characters refer to like elements.

As used herein, "A and/or B" refers to any of A alone, B alone, or a combination of both A and B.

As used herein, the term "light" encompasses electromagnetic radiation having wavelengths in one or more of the ultraviolet, visible, or infrared portions of the electromagnetic spectrum.

As used herein, the term "dispersive" is used, with respect to optical components, to describe a component that is designed to separate spatially, the different wavelength components of a polychromatic beam of light. Non-limiting examples of "dispersive" optical elements by this definition include diffraction gratings and prisms.

Figure 1:
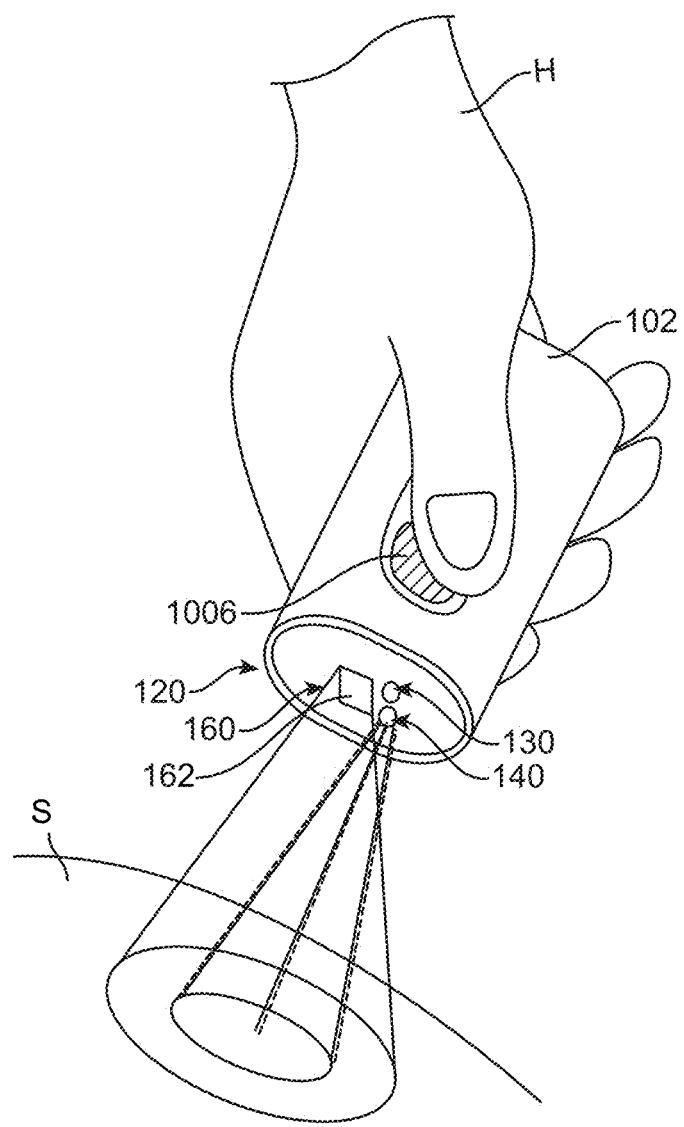
FIG. 1 shows an isometric view of an exemplary compact spectrometer.

FIG. 1 shows an isometric view of a compact spectrometer 102, in accordance with configurations. The spectrometer 102 can be used as a general purpose material analyzer for many applications. In particular, the spectrometer 102 can be used to identify materials or objects, provide information regarding certain properties of the identified materials, and accordingly provide users with actionable insights regarding the identified materials. The spectrometer 102 comprises a spectrometer head 120 configured to be directed towards a sample material S. The spectrometer head 120 comprises a spectrometer module 160, configured to obtain spectral information associated with the sample material S. The spectrometer module may comprise one or more optical components, such as a linear variable filter, as described in further detail herein. The spectrometer module may further comprise a spectrometer window 162, through which incident light from the sample material S can enter the spectrometer, to be subsequently measured by the optical components of the spectrometer module. The spectrometer head 120 may comprise an illumination module 140, comprising a light source configured to direct an optical beam to the sample material S within the field of view of the detector. The spectrometer head 120 may further comprise a sensor module 130, which may, for example, comprise a temperature sensor. The spectrometer may comprise simple means for users to control the operation of the spectrometer, such as operating button 1006. The compact size of the spectrometer 102 can provide a hand held device that can be directed (e.g., pointed) at a material to rapidly obtain information about the material. For example, as shown in FIG. 1, the spectrometer 102 may be sized to fit inside the hand H of a user.

Figure 2:
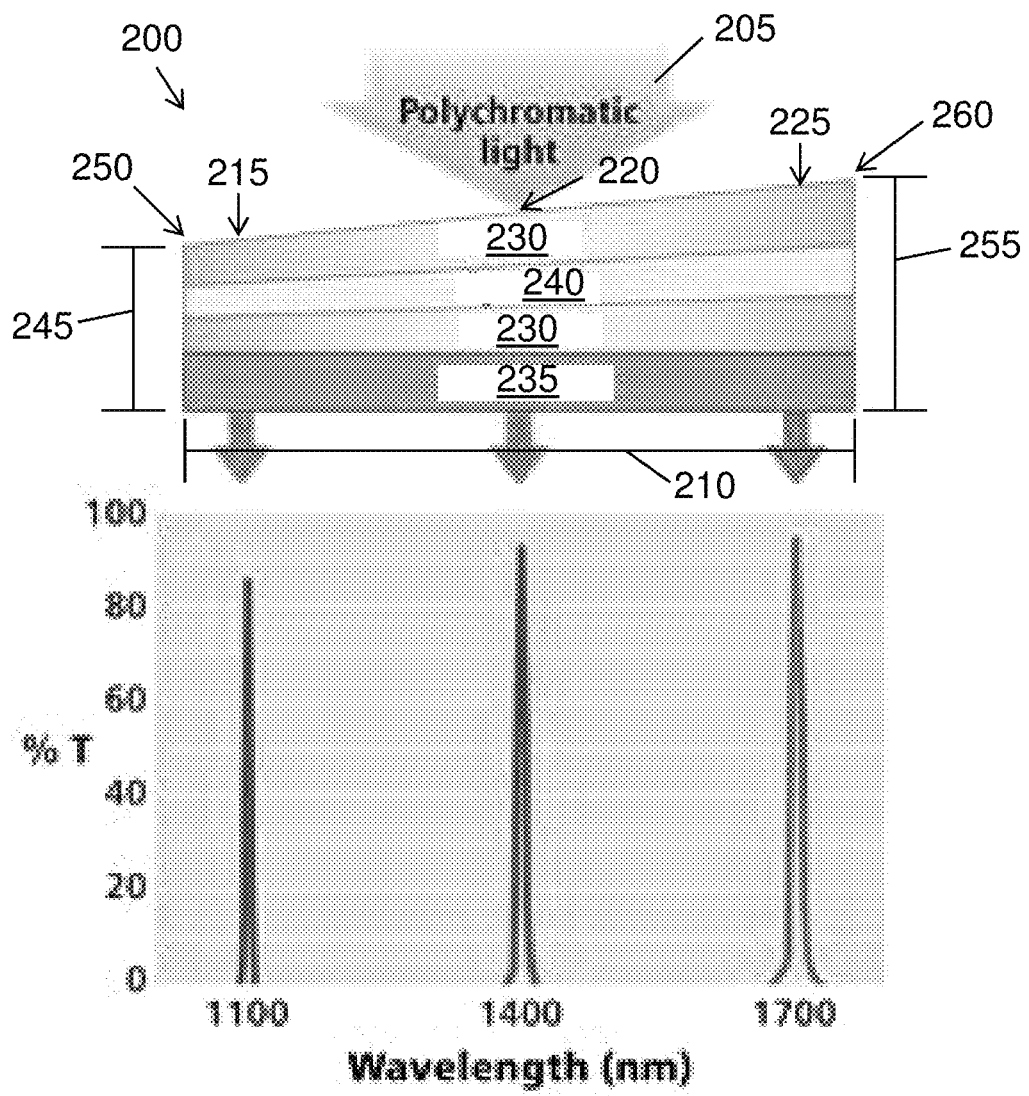
FIG. 2 shows a schematic diagram of an exemplary optical layout for a compact spectrometer.

FIG. 2 illustrates the principle of operation of an exemplary embodiment of a spatially variable filter, such as the linear variable filter 200. One example of a spatially variable filter is a linear variable filter, configured to have a plurality of transmission profiles that vary linearly across a length of the filter. Incident light 205, reflected from a surface of a sample material measured by the spectrometer, enters the spectrometer through a spectrometer input window, and hits the linear variable filter 200. The linear variable filter 200 can be configured to have a plurality of transmission profiles that vary linearly across a length 210 of the filter, each transmission profile comprising a passband centered around a center wavelength (CWL) and having a bandwidth. For example, as shown in FIG. 2, the filter can have a CWL of about 1100 nm at a first location 215, a CWL of about 1400 nm at a second location 220, and a CWL of about 1700 nm at a third location 225 along the length 210 of the filter. The bandwidth of each passband can be, for example, about 1-10% of the corresponding CWL, such as about 1 nm to about 200 nm, depending on the passband CWL. Accordingly, light 205 incident on the filter 200 can be spectrally separated by the filter, based on the location at which the incident light hits the filter. For example, as shown in FIG. 2, only portions of the incident light having wavelengths of about 1100 nm±the half bandwidth of the passband may be transmitted through the filter at location 215. Similarly, only portions of incident light having wavelengths of about 1400 nm±the half bandwidth of the passband may be transmitted through the filter at location 220, and only portions of incident light having wavelengths of about 1700 nm±the half bandwidth of the passband may be transmitted through the filter at location 225. The spectrally separated light transmitted through the filter 200 can be detected by a detector placed in series with the filter, such that the detector can then measure the amount, or intensity, of incident light at different wavelengths.

The linear variable filter 200 may comprise one or more filter coatings 230, such as bandpass filter coatings, coated onto a substrate 235. In some embodiments, the linear variable filter comprises two filter coatings 230 spaced apart with a spacer 240, such that the total thickness of the filter coating varies over the length 210 of the filter. For example, the thickness 245 of the filter coating at a first end 250 of the filter may be smaller than the thickness 255 of the filter coating on a second end 260 of the filter. A bandpass filter coating may be configured such that the passband CWL varies as a function of coating thickness. Thus, a linear variable filter having a thickness that varies linearly along its length can be configured to have a plurality of passband CWL that vary linearly along the length of the filter.

Figure 3:
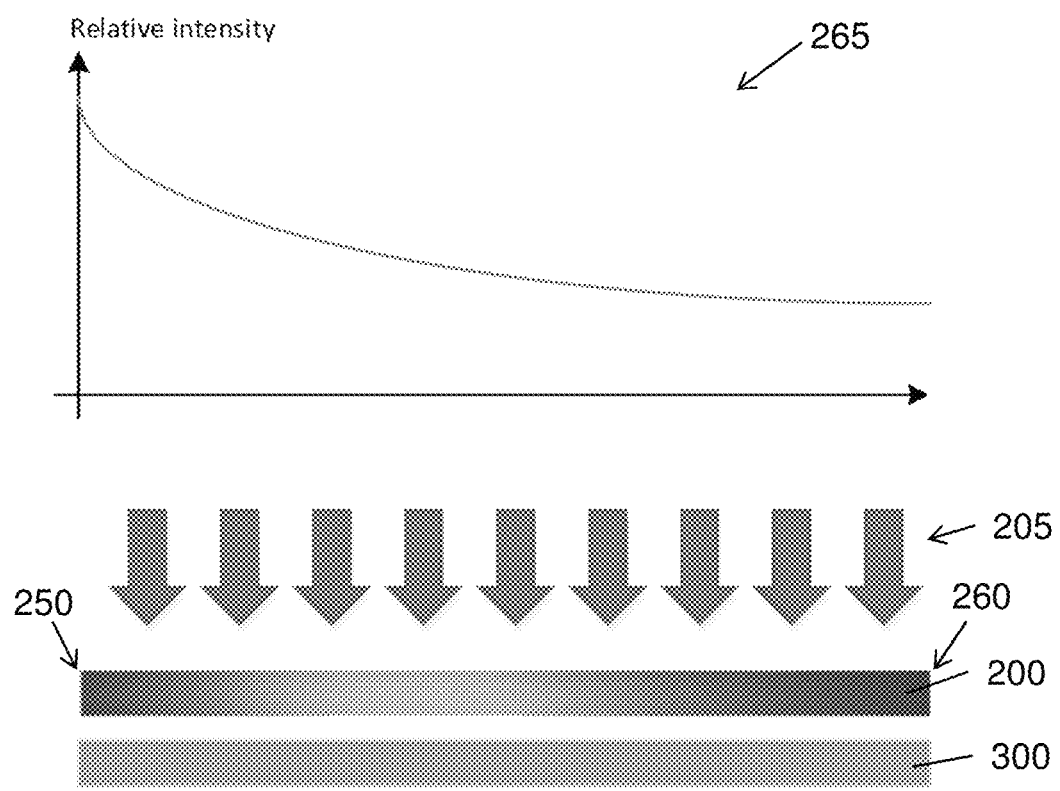
FIG. 3 illustrates an exemplary light intensity distribution on a linear variable filter.

FIG. 3 illustrates an exemplary light intensity distribution on a spatially variable filter, such as the linear variable filter 200. As sampling conditions vary, light 205 from the sample material incident on the spectrometer window may change in absolute intensity and in relative intensity across the area of filter. Variations in relative intensity across the area of the filter may be indistinguishable from true spectral variations of the incident light, thus introducing "false" spectral variations or distortions into the measured spectra. For example, if the spectrometer input window is tilted with respect to the sample plane, a first end 250 of a linear variable filter 200, positioned behind the spectrometer window, may be closer to the sample surface than a second end 260 of the filter. Accordingly, as shown in graph 265, the incident light may impinge upon the first end 250 of the filter at a higher intensity than at the second end 260 of the filter. A detector or sensor 300, optically coupled to the linear variable filter to receive light transmitted through the filter, may then detect a higher intensity of light having a wavelength corresponding to the transmission profile of the first end of the filter, while detecting a relatively weaker intensity of light having a wavelength corresponding to the transmission profile of the second end of the filter. In such a scenario, the differences in the detected intensity of light at different wavelengths would be at least partially attributable to the tilt of the spectrometer, rather than to the true spectral composition of the light reflected from the sample material. Such an outcome can distort the measured spectra of the sample depending on the tilt, position, or orientation of the spectrometer, or on other sampling conditions that can introduce similar distortions in the measured spectra.

A compact spectrometer, such as the handheld spectrometer 102 shown in FIG. 1, may often be used to measure a sample at various positions and/or orientations with respect to the sample plane. Therefore, a spatially variable filter for incorporation with a compact spectrometer would benefit from having reduced variations in measured input light intensity across the area of the filter, so as to improve the accuracy and reliability of spectral measurements of the same sample taken under different sampling conditions. Described herein are various exemplary embodiments of a spatially variable filter suitable for incorporation with a compact spectrometer, the spatially variable filter comprising a plurality of spaced apart filter regions having similar transmission profiles in order to measure spatial variation of the input light energy incident on the spatially variable filter. Each exemplary embodiment may comprise one or more linear variable filters, discrete filters, or combinations thereof. A linear variable filter, configured to have a plurality of transmission profiles that vary linearly across a length of the filter, is a special type of a spatially variable filter. Other types of spatially variable filters having various configurations and principles of operation are also described herein, wherein each type of spatially variable filter may have a different dependency between spatial locations and transmission profiles.

Figure 4:
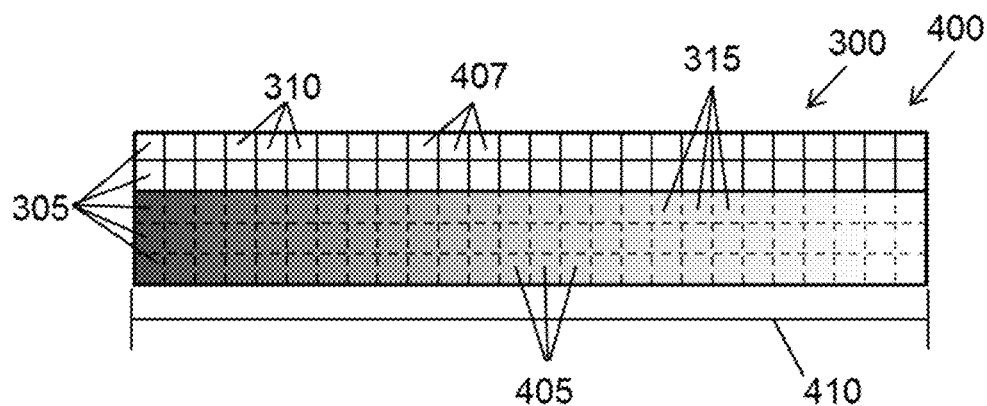
FIG. 4 illustrates an exemplary configuration of a linear variable filter suitable for incorporation with a compact spectrometer.

FIG. 4 illustrates an exemplary configuration of a linear variable filter 400 suitable for incorporation with a compact spectrometer. The linear variable filter 400 can be optically coupled to a detector 300, such that light reflected from a sample surface first passes through the filter, and the spectrally separated light then hits the detector. The detector 300 can comprise a plurality of detector elements 305, such as pixels. The detector may comprise, for example, an image sensor such as a CCD or a 2-D CMOS array. The filter 400 may be spaced apart from or in contact with the detector. For example, the filter may comprise a linear variable filter coating that is at least partially deposited on separate detector elements of the detector. Alternatively, the filter may comprise a support placed in proximity and configured to support and separate the detector elements in order to filter light spatially among the separate detector elements. The filter 400 may be aligned with the detector 300 such that the light spectrally separated by the filter impinges upon at least a portion of the detector elements. In many configurations, the filter and detector are aligned such that the spectrally separated light transmitted through the filter impinges upon the entire area of the detector.

The linear variable filter 400 can comprise a plurality of different spaced apart regions 405 having different transmission profiles, the transmission profiles varying linearly along the length 410 of the filter as described herein. Each filter region 405 can comprise an area of the filter 400 configured to transmit light that is received by a detector element operatively coupled to the filter region. The different transmission profiles may comprise full width half maximum (FWHM) ranges that are at least about 5 nm different from each other and/or center wavelengths at least about 5 nm different from each other, for example. The detector 300 may comprise a plurality of detector elements such as pixels 305, each detector element optically coupled to each of the different filter regions 405 of the filter 400. The filter 400 and detector 300 can be aligned such that each pixel 305 corresponds to a different location along the length 410 of the filter. Each pixel 305 can be configured to record an amount of the light detected by the pixel. The detected intensity of light at each pixel can correspond to the intensity of the incident light at a range of wavelengths determined by the transmission profile of the corresponding filter region 405. The detector 300 can be operatively coupled to a processor configured to receive data from the detector, and output spectral data in response to transmitted light intensity at the plurality of different filter regions 405.

As described herein, spectral data generated using a linear variable filter can be distorted by the effect of incident light intensity variations across the area of the filter. To address this issue, the linear variable filter 400 and the detector 300 may be configured such that at least a portion of the detector elements 305 of the detector receive incident light from the sample that has not been spectrally separated by the filter 400. For example, the detector 300 can comprise "exposed" pixels 310 and "covered" pixels 315, wherein the exposed pixels 310 receive unseparated incident light and the covered pixels 315 receive spectrally separated light transmitted through the filter 400. In configurations where the filter 400 comprises a separate filter unit placed in series with the detector 300, the filter unit can have an area that is smaller than the area of the detector so as to leave some of the detector pixels exposed, or the filter unit and the detector may be aligned so as to have a non-overlapping area. In embodiments where the filter 400 comprises a filter coating deposited directly onto the detector 300, the filter coating may be deposited over only a portion of the detector elements, so that a remaining portion of the detector elements remains uncoated. Preferably, the exposed pixels 310 extend over the entire length 410 of the linear variable filter 400, such that the exposed pixels can determine the distribution of light intensity across the entire length, and therefore over the entire spectrum, of the linear variable filter.

The exposed pixels 310 can record the intensity variation of the incident light across the area of the detector 300, providing a way of measuring spatial variations of incident light intensity across the area of the filter 400. The light distribution recorded by the exposed pixels can subsequently be used to reduce the contribution of spatial variations in light intensity in the output spectra. A processor coupled to the detector may be configured with instructions to adjust the output spectral data in response to the detected spatial intensity variations of light. The adjusted spectral data can comprise a more accurate representation of the spectral information of the measured sample.

Since the exposed pixels 310 receive unseparated light, the intensity of the signal recorded by the exposed pixels can be much greater than the intensity of the signal recorded by the covered pixels 315. In many instances, the difference between the intensity of the signal recorded by the exposed pixels and the covered pixels may be greater than the dynamic range of the detector 300. Accordingly, the exposure time of the detector may be set such that overexposure of the exposed pixels is avoided, though such an exposure time may yield a relatively low detected signal for the covered pixels. One approach to compensate for the difference in detected signal strength between the exposed and covered detector pixels is to reduce the detected signal strength for the exposed pixels. For example, the linear variable filter 400 may comprise a plurality of similar spaced apart regions 407 having similar transmission profiles, such that the incident light is transmitted through the similar regions 407 in a substantially uniform manner. Similar transmission profiles may comprise, for example, center wavelengths that are within a range from about 0.01 nm to about 5 nm of each another, and FWHM within a range from about 0.01 nm to about 5 nm of each another. The similar regions 407 may comprise a neutral density filter, or any type of uniform intensity filter configured to have a substantially fixed transmission profile along its length. Alternatively or in combination, the similar filter regions 407 may comprise a plurality of separate aperture elements or partially occluding structures placed over each detector element 305, to reduce the amount of light received by each exposed pixel 310. The similar filter regions 407 may extend along a distance comprising at least half of a maximum distance across the sensor, such as the length 410 of the filter. Another approach to compensate for the detected signal strength difference between the covered and exposed pixels is to configure different portions of the detector to have different exposure times. For example, the covered pixels, configured to receive light transmitted through the different filter regions 405, can be configured to have an exposure time that is longer than the exposure time of the exposed pixels, configured to receive light transmitted through the similar filter regions 410.

Figure 5A:
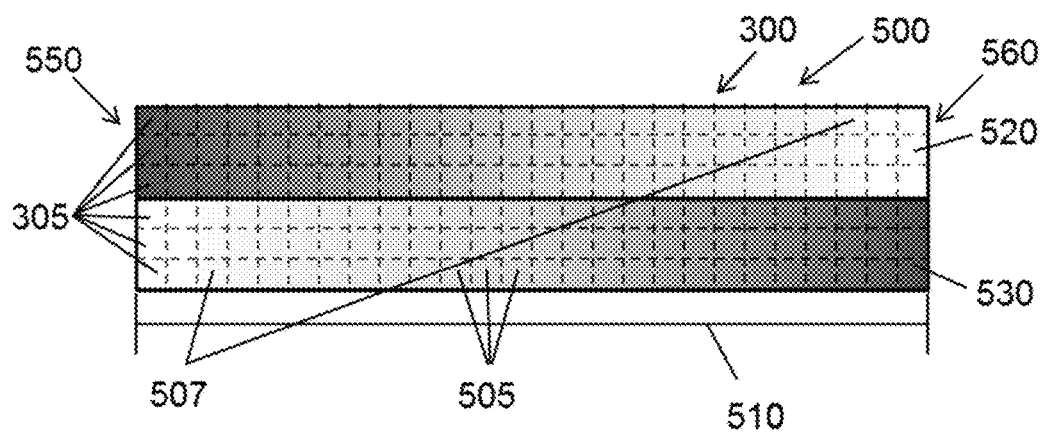
FIGS. 5A-5B illustrate another exemplary configuration of a linear variable filter suitable for incorporation with a compact spectrometer.
Figure 5B:
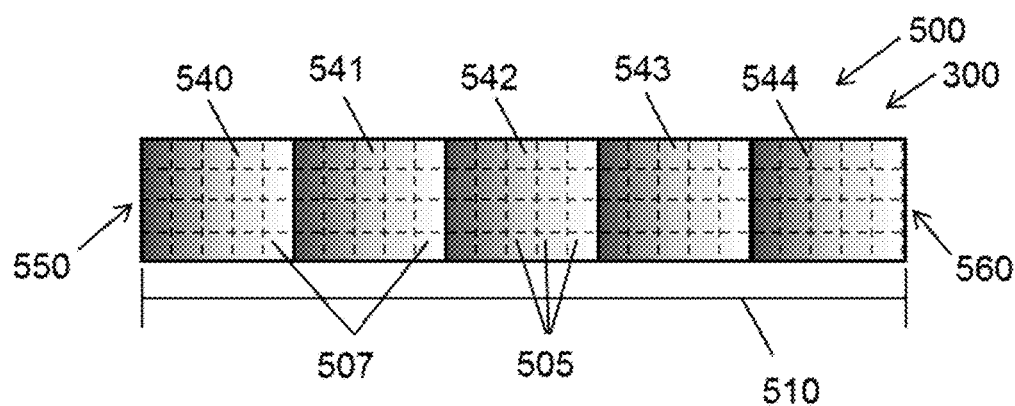

FIGS. 5A and 5B illustrate another exemplary configuration of a spatially variable filter 500 suitable for incorporation with a compact spectrometer. The spatially variable filter 500 can be optically coupled to a detector 300 comprising a plurality of detector elements such as pixels 305, as described in further detail in reference to the embodiment of FIG. 4. The spatially variable filter 500 can comprise a plurality of different spaced apart regions 505 having different transmission profiles, the transmission profiles varying linearly along the length 510 of the filter as described herein. Each filter region 505 can comprise an area of the filter 500 configured to transmit light that is received by a detector element operatively coupled to the filter region. The different transmission profiles may comprise full width half maximum (FWHM) ranges that are at least about 5 nm different from each other and/or center wavelengths at least about 5 nm different from each other, for example. The detector 300 may comprise a plurality of detector elements such as pixels 305, each detector element optically coupled to each of the different filter regions 505 of the filter 500. The filter 500 and detector 300 can be aligned such that each pixel 305 corresponds to a different location along the length 510 of the filter. Each pixel 305 can be configured to record an amount of the light detected by the pixel. The detected intensity of light at each pixel can correspond to the intensity of the incident light at a range of wavelengths determined by the transmission profile of the corresponding filter region. The detector 300 can be operatively coupled to a processor configured to receive data from the detector, and output spectral data in response to transmitted light intensity at the plurality of different filter regions 505.

As described herein, spectral data produced using a spatially variable filter can be distorted by the effect of incident light intensity variations across the area of the filter. To address this issue, the spatially variable filter 500 can comprise a plurality of similar spatially variable filter elements, such that the filter comprises a plurality of similar spaced apart filter regions 507 distributed over the area of the filter. Similar filter regions 507 may have similar transmission profiles, for example comprising center wavelengths that are within a range from about 0.01 nm to about 5 nm of each another, and/or FWHM within a range from about 0.01 nm to about 5 nm of each another. Spectral data generated with detector elements 305 coupled to the similar filter regions 507 can be used to determine a spatial variation in the intensity of the incident light, since the detector elements can detect light having similar transmission profiles impinging upon the filter 500 at different locations. The output spectra may then be adjusted to reduce the spatial variation in the intensity of incident light.

For example, as shown in FIG. 5A, the filter 500 may comprise two similar linear variable filter elements 520 and 530, oriented in opposite directions with respect to the two ends 550 and 560 of the filter 500. For example, if filter element 520 is oriented to transmit light of about 1100 nm at end 550 and about 1700 nm at end 560, the filter element 530 may be oriented to transmit light of about 1700 nm at end 550, and 1100 nm at end 560. The filter elements 520 and 530 can have similar linearly varying transmission profiles, such that the filter comprises a plurality of similar filter regions 507 having similar transmission profiles positioned at different locations of the filter 500. Detector elements 305 of the detector 300 may be configured to measure the intensity of the light transmitted through the plurality of similar filter regions 507. If the incident light does not contain any intensity variations across the area of the filter 500, the data collected by the detector elements coupled to the similar filter regions 507 will be similar or substantially identical. However, if the incident light contains intensity variations across the area of the filter 500, the data collected by the detector elements coupled to the similar filter regions 507 will be different. For example, the incident light may comprise a linear gradient along the length 510 of the filter 500, such that the intensity of the incident light is stronger at end 550 than at end 560. In this case, the detector elements coupled to filter region 507 of the filter element 530 will detect a higher intensity of light compared to the detector elements coupled to filter region 507 of the filter element 520.

If the measurement data collected by the plurality of detector elements coupled to the plurality of similar filter regions 507 indicate the presence of a spatial variation in the intensity of incident light, a data analysis algorithm may be applied to reduce the spatial variation in the output spectra. A processor coupled to the detector may be configured with instructions to adjust the output spectral data in response to the detected spatial intensity variations of light. For example, in the case of incident light having a linear gradient in intensity across the length 510 of the filter 500, the measurement data generated by detector elements coupled to a plurality of similar filter regions may be averaged. Thus, normalized or adjusted spectral data can comprise a more accurate representation of the spectral information of the measured sample.

While FIG. 5A shows the spatially variable filter 500 having two linear variable filter elements positioned in linearly opposite directions, filter 500 may comprise a plurality of spatially variable filter elements of any number and any suitable orientation to allow algorithmic compensation for relative intensity variations of the incident light. The detector 300 can comprise detector elements configured to measure the intensity of light transmitted through the plurality of different and similar filter regions of any number and/or spatial distribution across the filter 500. Accordingly, while the compensation algorithm has been described as an averaging of measurement data with respect to the configuration shown in FIG. 5A, any appropriate algorithm may be used to adjust the measured spectral data to reduce spatial variation of light intensity across the area of the filter 500.

For example, as shown in FIG. 5B, spatially variable filter 500 may comprise a plurality of adjacent filter elements 540, 541, 542, 543, and 544 concatenated one after another. Each filter element can be a linear variable filter configured to spectrally separate light over the full measured spectrum. Each filter element may comprise a plurality of different filter regions 505 having different transmission profiles. Collectively, the filter 500 may also comprise a plurality of similar filter regions 507 having similar transmission profiles, at a plurality of non-adjacent locations of the filter 500. The detector 300 may comprise a plurality of detector elements coupled to each filter region of the filter 500, in which each detector element is configured to measure the intensity of light transmitted through the filter region. The plurality of detector elements coupled to each filter element can produce a complete spectral representation of the incident light. The plurality of spectral representations obtained from a plurality of detector elements coupled to similar filter regions having similar transmission profiles can be compared with one another, in order to determine the intensity variation of the incident light, if any, across the area of the filter 500. The determined intensity variation can be factored into a data analysis algorithm to compensate for the measured intensity variations across the filter area.

Figure 6A:
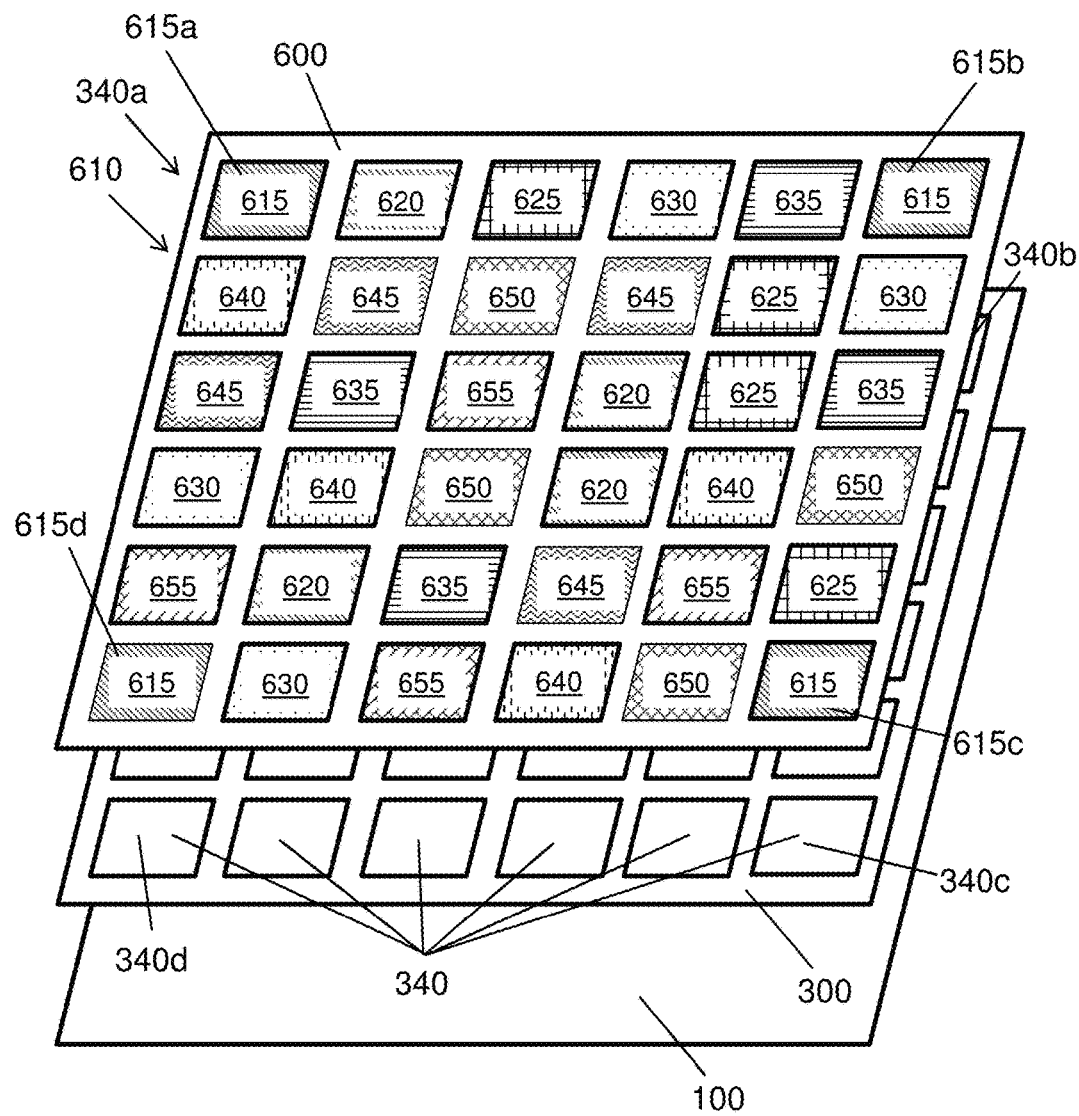
FIG. 6A illustrates an exemplary configuration of a spatially variable filter suitable for incorporation with a compact spectrometer.
Figure 6B:
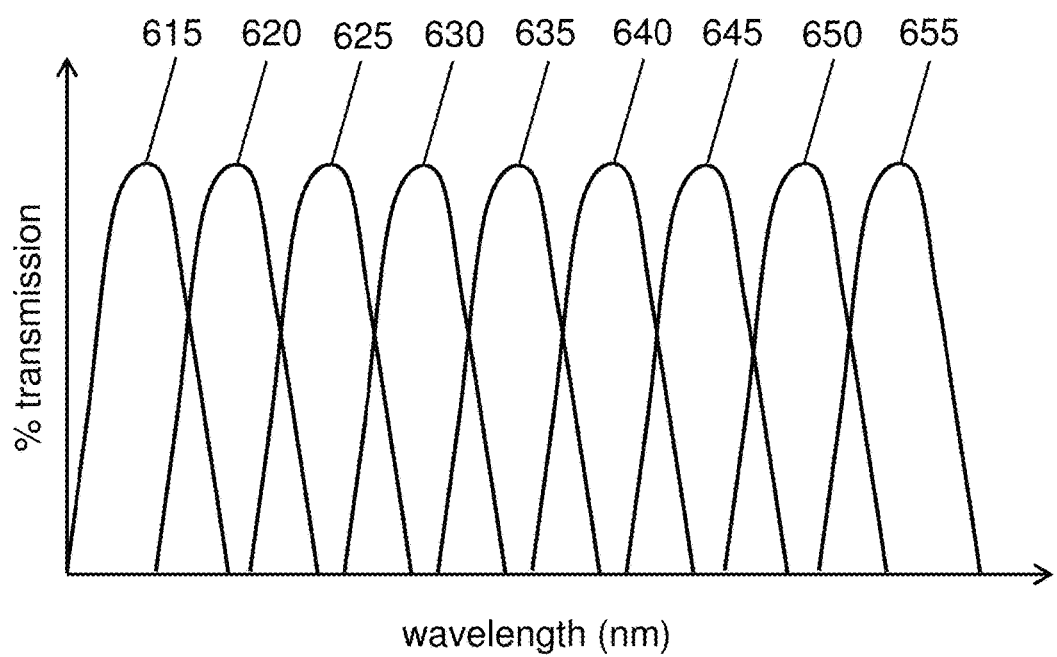
FIG. 6B illustrates exemplary transmission profiles of the plurality of different filters of FIG. 6A.

FIG. 6A illustrates an exemplary configuration of a spatially variable filter 600 suitable for incorporation with a spectrometer. The spatially variable filter 600 may comprise a two-dimensional array 610 composed of a plurality of filter regions. Each filter region can comprise an area of the filter 600 configured to transmit light that is received by a detector element operatively coupled to the filter region. The filter 600 may comprise a plurality of different spaced apart filter regions having different transmission profiles at different locations. The plurality of different filter regions may comprise a plurality of discrete filter elements. Alternatively or in combination, the plurality of different filter regions may comprise a plurality of spaced apart regions of a single, continuous filter element, wherein each of the plurality of regions comprises a unique transmission profile (e.g., as in a linear variable filter). Each different filter region can be configured to transmit a range of wavelengths distributed about a central wavelength. The array 610 may comprise, for example, a plurality of bandpass filters having passband widths in a range from about 1 nm to about 200 nm, for example. In the example shown in FIG. 6A, the spatially variable filter 600 comprises different filter regions 615, 620, 625, 630, 635, 640, 645, 650, and 655 configured to have different transmission profiles as described herein. FIG. 6B illustrates exemplary different transmission profiles of the plurality of different filter regions of FIG. 6A. The different transmission profiles may comprise full width half maximum (FWHM) ranges that are at least about 5 nm different from each other and/or center wavelengths at least about 5 nm different from each other, for example. Each of the different filter regions may have a transmission profile that partially overlaps and/or does not overlap with the transmission profile of another different filter of the array. Together, the plurality of different filters of the spatially variable filter can spectrally separate the light incident on the filter.

The spatially variable filter 600 may further comprise a plurality of similar spaced apart filter regions having similar transmission profiles that are different from other transmission profiles of the array. The plurality of similar filter regions may comprise a plurality of discrete filter elements. Alternatively or in combination, the plurality of similar filter regions may comprise a plurality of spaced apart regions of a single, continuous filter element, wherein the same continuous filter element may also comprise a plurality of different filter regions as described herein. The plurality of similar spaced apart filter regions can be positioned at a plurality of locations of the spatially variable filter in order to detect spatial variations of the incident light profile. Thus, at least one of the different transmission profiles of the spatially variable filter can be repeated at a plurality of spaced apart regions of the spatially variable filter. For example, as shown in FIG. 6A, the spatially variable filter 600 may comprise four similar filter regions 615a, 615b, 615c, and 615d having a similar transmission profile. Similar transmission profiles may comprise, for example, center wavelengths that are within a range from about 0.01 nm to about 5 nm of each another, and FWHM within a range from about 0.01 nm to about 5 nm of each another. The filter 600 preferably comprises at least two similar spaced apart regions having similar transmission profiles, wherein the two spaced apart regions may be at non-adjacent locations of the filter. For example, the two similar filter regions can be spatially separated by a distance comprising at least half of the maximum distance across the spatially variable filter. In the configuration shown in FIG. 6A, similar filter regions 615a, 615b, 615c, and 615d can be located, respectively, in the upper left hand corner, upper right hand corner, lower right hand corner, and lower left hand corner of the filter 600 to detect spatial variations of light incident on the array.

A detector 300, such as an image sensor as described herein, may be operatively coupled to the spatially variable filter 600, such that the incident light spectrally separated by the filter is subsequently detected by the detector. The detector may comprise a plurality of detector elements 340. Each detector element is optically coupled to each of the plurality of similar filter regions and each of the plurality of different filter regions. The plurality of detector elements may be configured in a two-dimensional array positioned in alignment with the filter array 610. Each detector element may comprise of plurality of pixels configured to detect the incident light. The filter 600 may be spaced apart from or in contact with the detector 300. For example, the filter may comprise a plurality of bandpass filter coatings at least partially deposited on the detector elements, or the filter may comprise a separate filter unit placed in series and aligned with the detector elements. Each of the plurality of filter regions of the filter 600 may be deposited on each of plurality of detector elements.

Each of the similar filter regions of the filter array, such as filters 615a, 615b, 615c, and 615d, can be optically coupled to a detector element 340. For example, as shown in FIG. 6A, detector element 340a can be configured to record the intensity of light transmitted through filter region 615a, detector element 340b can be configured to record the intensity of light transmitted through filter region 615b, detector element 340c can be configured to record the intensity of light transmitted through filter region 615c, and detector element 340d can be configured to record the intensity of light transmitted through filter region 615d. If the incident light is uniform in intensity across the area of the filter 600, the detector elements coupled to the plurality of similar filter regions may detect similar signal intensities. For example, each of detector elements 340a, 340b, 340c, and 340d may detect similar signal intensities for the spectral component of the incident light corresponding to the transmission profile of filter region 615. If the incident light varies in intensity across the area of the filter 600, the detector elements coupled to the plurality of similar filter regions may detect varying signal intensities. For example, each of detector elements 340a, 340b, 340c, and 340d may detect a different signal intensity for the spectral component of the incident light corresponding to the transmission profile of filter region 615. Thus, a filter array having two or more similar filter regions with the same transmission profile, distributed in different spatial locations of the filter array, can help detect the presence of incident light intensity variations across the area of the filter, as well as the pattern of the intensity variation.

A processor 100, operatively coupled to the detector 300, can receive measurement data from the detector, and output spectral data in response to the transmitted light intensity at the plurality of similar and different filter regions. The processor may comprise a tangible medium configured with instructions to receive input spectral data, the input spectral data comprising similar spectral data generated by the plurality of similar filter regions at a plurality of locations of the detector array. The processor may be further configured to determine a spatial variation of the intensity of incident light across the area of the filter 600. For example, the processor may comprise instructions to compare the spectral data generated by the plurality of detector elements coupled to the plurality of similar filter regions, thereby identifying any discrepancies in the spectral data generated by the similar filter regions at different locations of the spatially variable filter. The processor may further comprise instructions to generate output spectral data in response to the similar spectral data. The processor may be configured to adjust the output spectra in response to any detected intensity variations among the plurality of similar filters at a plurality of locations. For example, the processor may comprise instructions to apply an appropriate algorithm to adjust the measurement data generated by the detector, so as to reduce the effect of any spatial non-uniformity in the intensity of the sample light on the output spectra. The recorded signal intensity for a particular spectral component of the incident light may, for example, be averaged across all similar filter regions of the filter array configured to have similar transmission profiles.

A spatially variable filter may have any number of different filter regions having different transmission profiles, and each different transmission profile may be repeated at any number of spaced apart regions of the spatially variable filter so as to provide a plurality of similar filter regions. For example, a spatially variable filter as described herein may comprise at least N different filter regions having N different transmission profiles, wherein N is an integer within a range from about 3 to about 1,000,000. For example, N may be at least 5, at least 6, at least 7, at least 8, at least 9 or at least 10, for example. At least one of the N different transmission profiles may be repeated at M spaced apart regions of the spatially variable filter, wherein M is an integer within a range from about 2 to about 100. For example, M may be at least two. N may be greater than M, or M may be greater than N. N may be at least five times M, or N may be at least one hundred times M. Each different transmission profile may be repeated at a different number of spaced apart regions of the spatially variable filter. For example, a first transmission profile may be repeated at two spaced apart regions so as to provide two similar filter regions having the first transmission profile, while a second transmission profile different from the first transmission profile may be repeated at five spaced apart regions so as to provide five similar filter regions having the second transmission profile. The different filter regions and similar filter regions of the spatially variable filter may be distributed in any spatial pattern. Each filter region may comprise any transmission profile suitable for collecting spectral representations of a sample material, such that collectively, the filter array can spectrally separate the incident light to generate a spectral representation of the incident light.

FIGS. 7A-7C illustrate exemplary configurations of a spatially variable filter suitable for incorporation with a spectrometer. In these exemplary configurations and in other configurations of a spatially variable filter as described herein, the spatially variable filter comprises a plurality of different filter regions and a plurality of similar filter regions, wherein the plurality of filter regions may comprise a plurality of discrete filter elements, a plurality of spaced apart regions of a single, continuous filter element, or a combination thereof. Each filter region can comprise an area of the filter configured to transmit light that is received by a detector element operatively coupled to the filter region. FIG. 7A illustrates a spatially variable filter 700a comprising 8 different filter regions (N=8), each of which is repeated at 2 spaced apart regions of the filter 700a to provide 2 similar filter regions (M=2). Each of the 8 different filter regions 701, 702, 703, 704, 705, 706, 707, and 708 can be configured to have a unique transmission profile. Each different transmission profile is repeated at two spaced apart regions of the filter 700a, such that the filter 700a comprises two similar filter regions for each different transmission profile. As shown, filter region 701 having a unique transmission profile is repeated at two spaced apart regions of the filter 700a to provide two similar filter regions 701a and 701b having similar transmission profiles. Filter region 701a is located at the upper left hand corner of the filter 700a, while 701b is located at the lower right hand corner of the filter 700a. FIG. 7B illustrates a spatially variable filter 700b comprising 9 different filter regions (N=9), only one of which is repeated at 8 spaced apart regions of the filter 700b to provide 8 similar filter regions (M=8). Each of the 9 different filter regions 701, 702, 703, 704, 705, 706, 707, 708, and 709 can be configured to have a unique transmission profile. The transmission profile of filter region 709 is repeated at 8 different locations of the filter 700b to provide 8 similar filter regions 709a, 709b, 709c, 709d, 709e, 709f, 709g, and 709h having similar transmission profiles. Each similar filter region is disposed at a different location of the spatially variable filter 700b, for example at different locations along the length 710b of the filter 700b. FIG. 7C illustrates a spatially variable filter 700c comprising 9 different filter regions (N=9) each having a unique transmission profile, wherein 8 of the different transmission profiles are repeated at 5 different locations ($M_1$=5), and wherein one of the different transmission profiles is repeated at 8 different locations ($M_2$=8). Each of the 8 different transmission profiles of filter regions 701, 702, 703, 704, 705, 706, 707, and 708 is repeated at 5 different locations along the width 715c of filter 700c, such that the filter 700c comprises 5 similar filter regions for each of the transmission profiles. For example, as shown in FIG. 7C, the transmission profile of filter region 701 is repeated at 5 different locations, yielding similar filter regions 701a, 701b, 701c, 701d, and 701e having a similar transmission profile. The transmission profile of filter region 709 is repeated at 9 different locations along the length 710c of the filter 700c, such that filter 700c comprises 9 similar filter regions having similar transmission profiles. As shown in FIG. 7C, the transmission profile of filter region 709 is repeated at 8 different locations, yielding 8 similar filter regions 709a, 709b, 709c, 709d, 709e, 709f, 709g, and 709h.

Figure 8:
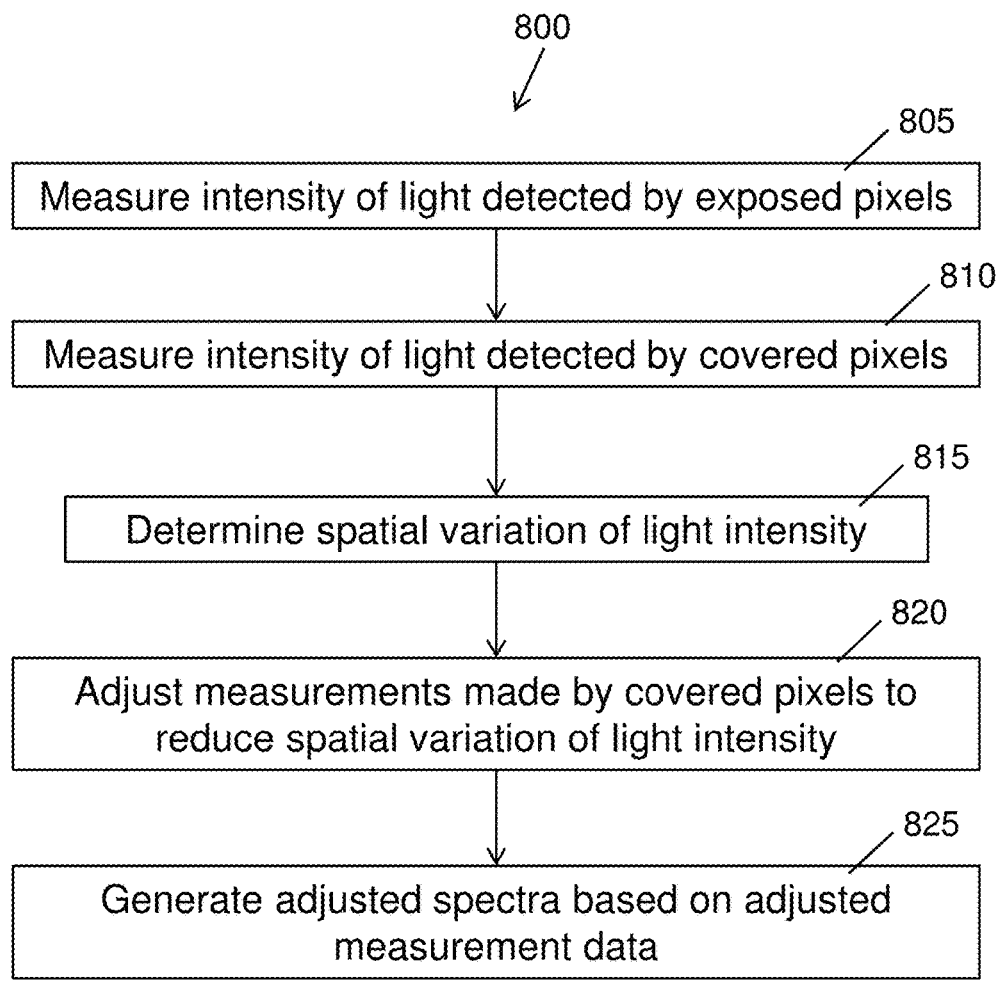
FIG. 8 is a flow chart illustrating a method of reducing measured intensity variations across an area of a linear variable filter as shown in FIG. 4.

FIG. 8 is a flow chart illustrating a method 800 of reducing measured intensity variations across an area of a linear variable filter 400 as shown in FIG. 4. In step 805, the intensity of light incident on the filter 400 is measured by the covered pixels, or the pixels of a detector receiving light spectrally separated by a plurality of different filter regions of the filter 400. In step 810, the intensity of light incident on the filter 400 is measured by the exposed pixels, or the pixels of the detector receiving unseparated light, wherein the unseparated light may be transmitted through a plurality of similar filter regions of the filter 400. The exposed pixels can measure the variation, if any, of the incident light across the area of the filter 400, by recording the intensity distribution of the spectrally unseparated light over the length of the linear variable filter. In step 815, the spatial variation of light intensity on the filter is determined, by analyzing the signals measured by the exposed pixels. Step 815 can comprise, for example, determining the pattern and/or gradient of the variation of light intensity across the length of the linear variable filter 400. In step 820, the measurements made by the covered pixels of the detector are adjusted to reduce the spatial variation of light intensity determined in step 815. For example, signals recorded by covered pixels corresponding to locations of relatively high light intensity can be adjusted downwards by an appropriate amount, while signals recorded by covered pixels corresponding to locations of relatively low light intensity can be adjusted upwards by an appropriate amount. In step 825, adjusted sample spectra are generated based on the adjusted measurement data.

Figure 9:
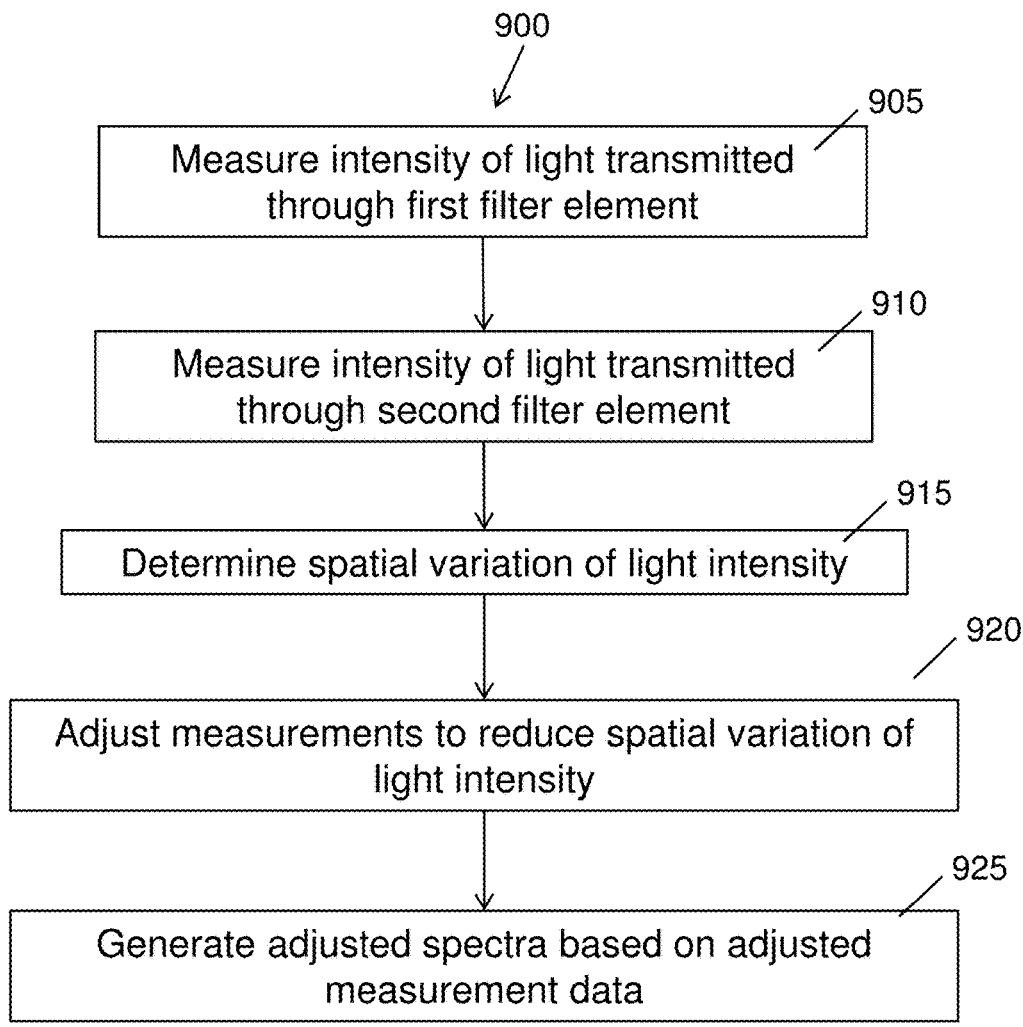
FIG. 9 is a flow chart illustrating a method of reducing measured intensity variations across an area of a linear variable filter as shown in FIGS. 5A and 5B.

FIG. 9 is a flow chart illustrating a method 900 of reducing measured intensity variations across an area of a spatially variable filter 500 as shown in FIGS. 5A and 5B. In step 905, the intensity of light incident on a first spatially variable filter element is measured by a detector receiving light transmitted through the first filter element. In step 910, the intensity of light incident on a second spatially variable filter element is measured by the detector receiving light transmitted through the second filter element. In embodiments of the filter 500 that comprise more than two filter elements, step 910 may be repeated as many times as necessary to collect data from all filter elements. In step 915, the spatial variation of light intensity on the filter is determined, by comparing the spectra of light transmitted through the two or more spatially variable filter elements. Step 915 can comprise, for example, determining the pattern and/or gradient of the variation of light intensity across the length of the spatially variable filter 500. In step 920, the detector measurements are adjusted to reduce the spatial variation of light intensity determined in step 915. For example, if the incident light is determined to have a linear gradient in step 915, the measurements made by the two or more filter elements for a particular spectral component of light can be averaged. In step 925, adjusted sample spectra are generated based on the adjusted measurement data.

Figure 10:
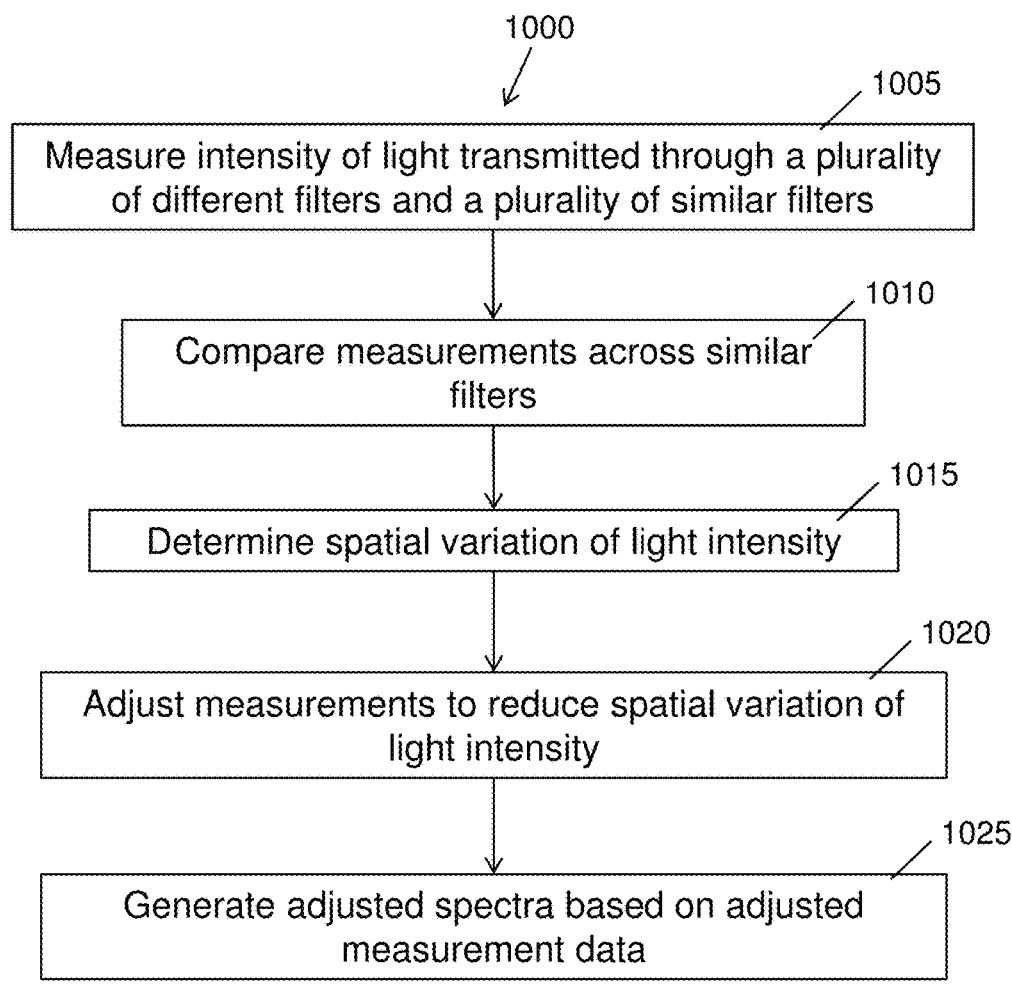
FIG. 10 is a flow chart illustrating a method of reducing measured intensity variations across an area of a linear variable filter as shown in FIG. 6A.

FIG. 10 is a flow chart illustrating a method 1000 of reducing measured intensity variations across an area of a spatially variable filter 600 as shown in FIG. 6A. In step 1005, the intensity of light incident on a plurality of different filter regions and a plurality of similar filter regions of the filter 600 is measured, wherein the similar filter regions are configured to have similar transmission profiles and are positioned in a plurality of locations of the filter array of filter 600, as described herein. In step 1010, the measurements across the similar filter regions are compared. In step 1015, the spatial variation of light intensity on the filter is determined, based on the comparison of measurements across the similar filter regions performed in step 1010. Step 1015 can comprise, for example, determining the pattern and/or gradient of the variation of light intensity across the area of the spatially variable filter 600. In step 1020, the detector measurements are adjusted to reduce the spatial variation of light intensity determined in step 1015. For example, if the incident light is determined to vary across the area of the filter, the measurements made by the plurality of similar filters can be averaged. In step 1025, adjusted sample spectra are generated based on the adjusted measurement data.

For all methods described herein, many variations and modifications may be made based on the disclosure provided herein. For example, some steps may be added, removed, or substituted. Some of the steps may comprise sub-steps, and many of the steps can be repeated.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure provided herein without departing from the spirit and scope of the invention as described herein.

While preferred embodiments of the present disclosure have been shown and described herein, it will be obvious to those skilled in the art that such embodiments are provided by way of example only. Numerous variations, changes, and substitutions will be apparent to those skilled in the art without departing from the scope of the present disclosure. It should be understood that various alternatives to the embodiments of the present disclosure described herein may be employed without departing from the scope of the present invention. Therefore, the scope of the present invention shall be defined solely by the scope of the appended claims and the equivalents thereof.

What is claimed is:

1. A spectrometer comprising:
a spatially variable filter comprising a first plurality of similar spaced apart filter regions having similar transmission profiles and a second plurality of at least five different spaced apart filter regions having at least five different transmission profiles, wherein the first plurality of similar spaced apart filter regions having similar transmission profiles is separated by regions having different transmission profiles; and
a detector comprising a plurality of detector elements coupled to the spatially variable filter; and
a processor configured with instructions to receive data from the detector and output spectral data to determine a spectrum in response to transmitted light intensity at the plurality of similar spaced apart filter regions and the plurality of different spaced apart filter regions.

2. The spectrometer of claim 1, wherein the processor is configured with instructions to adjust the output spectral data in response to spatial intensity variations of light incident on the spatially variable filter.

3. The spectrometer of claim 1, wherein the processor is configured with instructions to adjust the output spectral data in response to transmitted light intensity variations among the plurality of similar spaced apart filter regions.

4. The spectrometer of claim 1, wherein the plurality of detector elements comprises a first plurality of detector elements coupled to the spatially variable filter at each of the first plurality of similar spaced apart filter regions and wherein the plurality of detector elements comprises a second plurality of detector elements coupled to the spatially variable filter at each of the second plurality of different spaced apart filter regions.

5. The spectrometer of claim 1, wherein the plurality of similar spaced apart filter regions comprises at least two similar filter regions spaced apart by a distance comprising at least half of a maximum distance across the detector.

6. The spectrometer of claim 1, wherein the spatially variable filter comprises one or more of a linear variable filter having a variable spectral transmission profile, a plurality of discrete filter elements having separate discrete transmission profiles, a neutral density filter, a uniform intensity filter, a plurality of separate aperture elements, or a plurality of separate partially occluding structures.

7. The spectrometer of claim 6, wherein one or more of the neutral density filter or the uniform intensity filter extends along a distance comprising at least half of a maximum distance across the detector, the one or more of the neutral density filter or the uniform intensity filter comprising a substantially fixed transmission profile along the distance.

8. The spectrometer of claim 1, wherein the spatially variable filter has been at least partially deposited on separate detector elements of the detector.

9. The spectrometer of claim 1, wherein the similar transmission profiles of the first plurality of similar spaced apart filter regions comprise full width half maximums within a range from about 0.01 nm to about 5 nm of each other and center wavelengths within a range from about 0.01 nm to about 5 nm of each other.

10. The spectrometer of claim 1, wherein the first plurality of similar spaced apart filter regions and the second plurality of different spaced apart filter regions comprise one or more of a plurality of discrete filter elements or a plurality of spaced apart regions of a single, continuous filter element.

11. The spectrometer of claim 1, wherein each of the first plurality of similar spaced apart filter regions and the second plurality of different spaced apart filter regions comprises an area of the spatially variable filter configured to transmit light that is received by a detector element operatively coupled to said filter region.

12. The spectrometer of claim 1, wherein the first plurality of similar spaced apart filter regions comprises non-adjacent spaced apart regions of the spatially variable filter.

13. The spectrometer of claim 1, wherein the second plurality of different spaced apart filter regions comprises at least N different transmission profiles and wherein the first plurality of similar spaced apart filter regions comprises M spaced apart regions of the spatially variable filter, and wherein N and M are each integers and N is within a range from about 5 to about 1,000,000 and M is within a range from about 2 to about 100.

14. The spectrometer of claim 13, wherein N is greater than M.

15. The spectrometer of claim 13, wherein N is at least five times M.

16. The spectrometer of claim 13, wherein N is at least one hundred times M.

17. The spectrometer of claim 1, wherein the at least five different transmission profiles comprise full width half maximum ranges at least about 5 nm different from each other or center wavelengths at least about 5 nm different from each other.

18. The spectrometer of claim 1, wherein at least one of the at least five different transmission profiles overlaps with another of the at least five different transmission profiles.

19. The spectrometer system of claim 1, wherein the spatially variable filter comprises a two-dimensional array and the detector comprises a two-dimensional array having detector elements comprising pixels.

* * * * *